United States Patent
Hanratty et al.

(10) Patent No.: US 10,428,575 B2
(45) Date of Patent: Oct. 1, 2019

(54) VENTED HINGE ASSEMBLY

(71) Applicant: The Boeing Company, Chicago, IL (US)

(72) Inventors: Derrick J. Hanratty, Snohomish, WA (US); Bradley J. Corradi, Everett, WA (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 15/468,392

(22) Filed: Mar. 24, 2017

(65) Prior Publication Data
US 2018/0274283 A1 Sep. 27, 2018

(51) Int. Cl.
| | |
|---|---|
| *E05D 7/00* | (2006.01) |
| *E06B 5/12* | (2006.01) |
| *E05D 11/00* | (2006.01) |
| *B64C 1/14* | (2006.01) |
| *E05D 3/04* | (2006.01) |
| *E05D 5/02* | (2006.01) |
| *E05D 5/04* | (2006.01) |

(Continued)

(52) U.S. Cl.
CPC .............. *E06B 5/12* (2013.01); *B64C 1/1461* (2013.01); *E05D 3/04* (2013.01); *E05D 5/02* (2013.01); *E05D 7/009* (2013.01); *E05D 11/00* (2013.01); *E05D 5/04* (2013.01); *E05D 5/06* (2013.01); *E05Y 2900/502* (2013.01); *E05Y 2900/531* (2013.01); *E06B 7/10* (2013.01)

(58) Field of Classification Search
CPC . E06B 5/12; E06B 7/10; B64C 1/1461; E05D 3/04; E05D 5/02; E05D 7/009; E05D 11/00; E05Y 2900/531; Y10T 16/5595; Y10T 16/55963
See application file for complete search history.

(56) References Cited

U.S. PATENT DOCUMENTS

| | | |
|---|---|---|
| 457,894 A | 8/1891 | Shields |
| 2,668,982 A | 2/1954 | Ridgway |

(Continued)

FOREIGN PATENT DOCUMENTS

GB 287430 A 3/1928

OTHER PUBLICATIONS

Search Report for related European Application No. 18155027.8; report dated Jul. 17, 2018.

*Primary Examiner* — Jerry E Redman
(74) *Attorney, Agent, or Firm* — Miller, Matthias & Hull LLP (57) ABSTRACT

A hinge assembly includes a first monument piece having a first knuckle and a monument leaf attached, and a second monument piece having a first knuckle and a monument leaf attached to the first knuckle of the second monument piece, with the second monument piece spaced apart from the first monument piece by a monument piece space. A door piece includes an intermediate door knuckle extending across the monument piece space, and a door leaf coupled to the intermediate door knuckle. A pin extends through the first knuckle of the first monument piece, the first knuckle of the second monument piece, and the intermediate door knuckle. When the hinge assembly is mounted to a door and monument, a space is formed between the intermediate door knuckle and the monument to define a vent gap through the hinge assembly.

20 Claims, 5 Drawing Sheets

(51) Int. Cl.
 *E05D 5/06* (2006.01)
 *E06B 7/10* (2006.01)

(56) References Cited

U.S. PATENT DOCUMENTS

| | | |
|---|---|---|
| 3,483,586 A | 12/1969 | Watson |
| 5,778,491 A | 7/1998 | Baer |
| 9,990,819 B2 * | 6/2018 | Ricks .................... G08B 25/10 |
| 2007/0056980 A1 * | 3/2007 | Sambrailo ............ B65D 5/4295 |
| | | 220/592.01 |
| 2008/0217330 A1 * | 9/2008 | Baum ................ B65D 77/0413 |
| | | 220/23.83 |
| 2016/0031613 A1 * | 2/2016 | Chasteen ........... B65D 17/4012 |
| | | 220/269 |
| 2017/0260783 A1 * | 9/2017 | Crolley .................... E05D 3/04 |

* cited by examiner

VENTED HINGE ASSEMBLY

FIELD

The present disclosure generally relates to hinges and, more particularly, to hinges used in variable pressure environments.

BACKGROUND

Hinges are generally known for pivotably attaching a door to a frame. For structural, aesthetic, or other reasons, a continuous or "piano" hinge may be used. The door and hinge may be used in certain environments, such as on-board an aircraft or at industrial plant site, that may potentially experience rapid changes in pressure. Such a rapid pressure change may create a significant pressure difference on opposite sides of the door, which may create forces that push the door open and/or damage the door, hinge, or frame. Conventional solutions to this problem include providing vents through the door, which are visible, unattractive, and adds weight and cost to the door assembly, or increasing the structural strength of the components used for the door and frame, which also increases weight and cost.

SUMMARY

In accordance with one aspect of the present disclosure, a hinge assembly is provided for pivotably attaching a door to a monument. The hinge assembly includes a first monument piece including a first knuckle and a monument leaf attached to the first knuckle of the first monument piece and configured for coupling to the monument, and a second monument piece including a first knuckle and a monument leaf attached to the first knuckle of the second monument piece and configured for coupling to the monument, wherein the second monument piece is spaced apart from the first monument piece by a monument piece space. A door piece includes an intermediate door knuckle extending across the monument piece space, and a door leaf coupled to the intermediate door knuckle and configured for attachment to the door, and a pin extends through the first knuckle of the first monument piece, the first knuckle of the second monument piece, and the intermediate door knuckle. When the hinge assembly is mounted to the door and monument, a space is formed between the intermediate door knuckle and the monument to define a vent gap through the hinge assembly.

In accordance with another aspect of the present disclosure, a door assembly includes a door defining a fixed end, a free end, a top end, and a bottom end, and a frame extending around the door and including a monument, a side edge spaced apart from the monument, a top edge extending between the monument and the side edge, and a bottom edge spaced apart from the top edge and extending between the monument and the side edge. A hinge assembly pivotably mounts the door to the monument, and includes a first monument piece including a first knuckle and a monument leaf attached to the first knuckle of the first monument piece and configured for coupling to the monument, a second monument piece including a first knuckle and a monument leaf attached to the first knuckle of the second monument piece and configured for coupling to the monument, wherein the second monument piece is spaced apart from the first monument piece by a monument piece space, and a door piece. The door piece includes an intermediate door knuckle extending across the monument piece space, a door leaf coupled to the intermediate door knuckle and configured for attachment to the door, the door leaf comprising defining a receptacle configured to receive the fixed end of the door, and a pin extending through the first knuckle of the first monument piece, the first knuckle of the second monument piece, and the intermediate door knuckle. When the hinge assembly is mounted to the door and monument, a space is formed between the intermediate door knuckle and the monument to define a vent gap through the hinge assembly. Additionally, a position of the fixed end of the door is adjustable relative to the receptacle to create a side gap between the free end of the door and the side edge of the frame, a top gap between the top end of the door and the top edge of the frame, and a bottom gap between the bottom end of the door and the bottom edge of the frame.

In accordance with a further aspect of the present disclosure, a door assembly includes a door defining a fixed end, a monument configured to support the door, and a hinge assembly. The hinge assembly includes a first monument piece having a first knuckle, a second knuckle spaced apart from the first knuckle, and a monument leaf extending between the first and second knuckles of the first monument piece and configured for coupling to the monument. The hinge assembly further includes a second monument piece having a first knuckle, a second knuckle spaced apart from the first knuckle, and a monument leaf extending between the first and second knuckles of the second monument piece and configured for coupling to the monument, wherein the second monument piece is spaced apart from the first monument piece by a monument piece space. A door piece of the hinge assembly includes a first door knuckle extending between the first and second knuckles of the first monument piece, a second door knuckle extending between the first and second knuckles of the second monument piece, an intermediate door knuckle disposed between the first and second door knuckles and extending across the monument piece space, and a door leaf coupled to the first door knuckle, second door knuckle, and intermediate door knuckle, and configured for attachment to the fixed end of the door. Still further, the hinge assembly includes a pin extending through the first and second knuckles of the first monument piece, the first and second knuckles of the second monument piece, the first door knuckle, the second door knuckle, and the intermediate door knuckle. When the hinge assembly is mounted to the door and monument, a space is formed between the intermediate door knuckle and the monument to define a vent gap through the hinge assembly.

The features, functions, and advantages that have been discussed can be achieved independently in various embodiments or may be combined in yet other embodiments further details of which can be seen with reference to the following description and drawings.

It should be understood that the drawings are not necessarily drawn to scale and that the disclosed embodiments are sometimes illustrated schematically. It is to be further appreciated that the following detailed description is merely exemplary in nature and is not intended to limit the disclosure or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
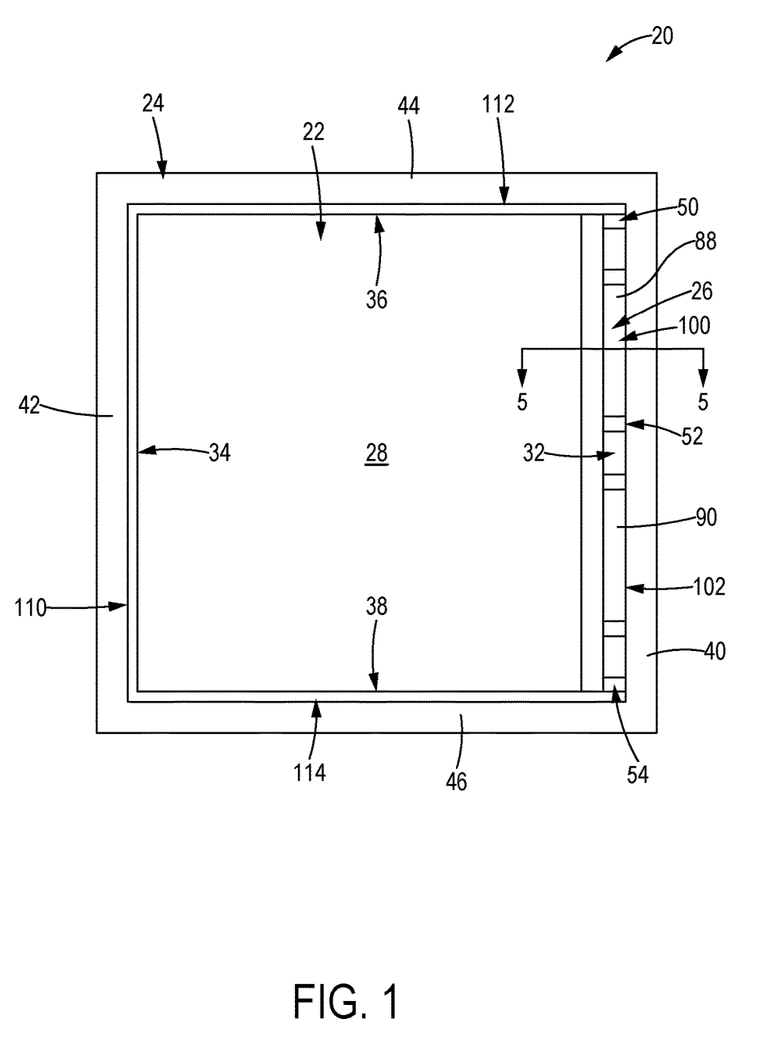
FIG. 1 is a side elevation view of a door assembly including a vented hinge, according to the present disclosure.

FIG. 1 illustrates a door assembly 20 constructed according to the present disclosure. The door assembly 20 may be provided in an area subject to rapid changes in ambient conditions, such as temperature and/or pressure. The area in which the door assembly 20 resides may be stationary, such as in a building or at an industrial plant, or it may be mobile, such as on a vehicle like an aircraft or boat. While examples of the door assembly 20 are described herein in connection with being located on an aircraft that may experience sudden pressure changes, it will be appreciated that the door assembly 20 may be provided in other areas and that may experience sudden changes in different ambient conditions, such as temperature.

The door assembly 20 generally includes a door 22 joined to a frame 24 by a hinge assembly 26. The door 22 may have opposite exterior and interior faces 28, 30 exposed to different environments. For example, the exterior face 28 may be exposed to a cabin of an aircraft, while the interior face 30 is exposed to a compartment, such as a closet. When an ambient condition rapidly changes on one side of the door 22, a gradient exists across the door 22 that could force the door to move from its intended position, or could damage the door assembly 20 and/or its surrounding area. Accordingly, the hinge assembly 26 creates one or more vent gaps or passages when mounted to the door and monument, as will be discussed in greater detail below, to better balance temperature, pressure, or other imbalances across the door 22 in the event of a sudden change in ambient conditions.

In greater detail, the door 22 may include a fixed end 32, a free end 34, a top end 36, and a bottom end 38. While the door 22 is illustrated as being quadrangular, it will be appreciated that the door 22 may be formed in other shapes, included triangular shapes, other four-sided shapes, and shapes having five or more sides.

The frame 24 generally extends around, and provides a support for, the door 22. In the example illustrated in FIG. 1, the frame 24 includes a monument 40 that supports the door 22, a side edge 42 spaced apart from the monument 40, a top edge 44 extending between the monument 40 and the side edge 42, and a bottom edge 46 spaced apart from the top edge 44 and extending between the monument 40 and the side edge 42. The frame 24 may have a shape that is complementary to the door 22, and therefore may be provided in any of the shapes noted above. Alternatively, in some embodiments, the frame 24 may have a shape that is different than the door 22.

Figure 2:
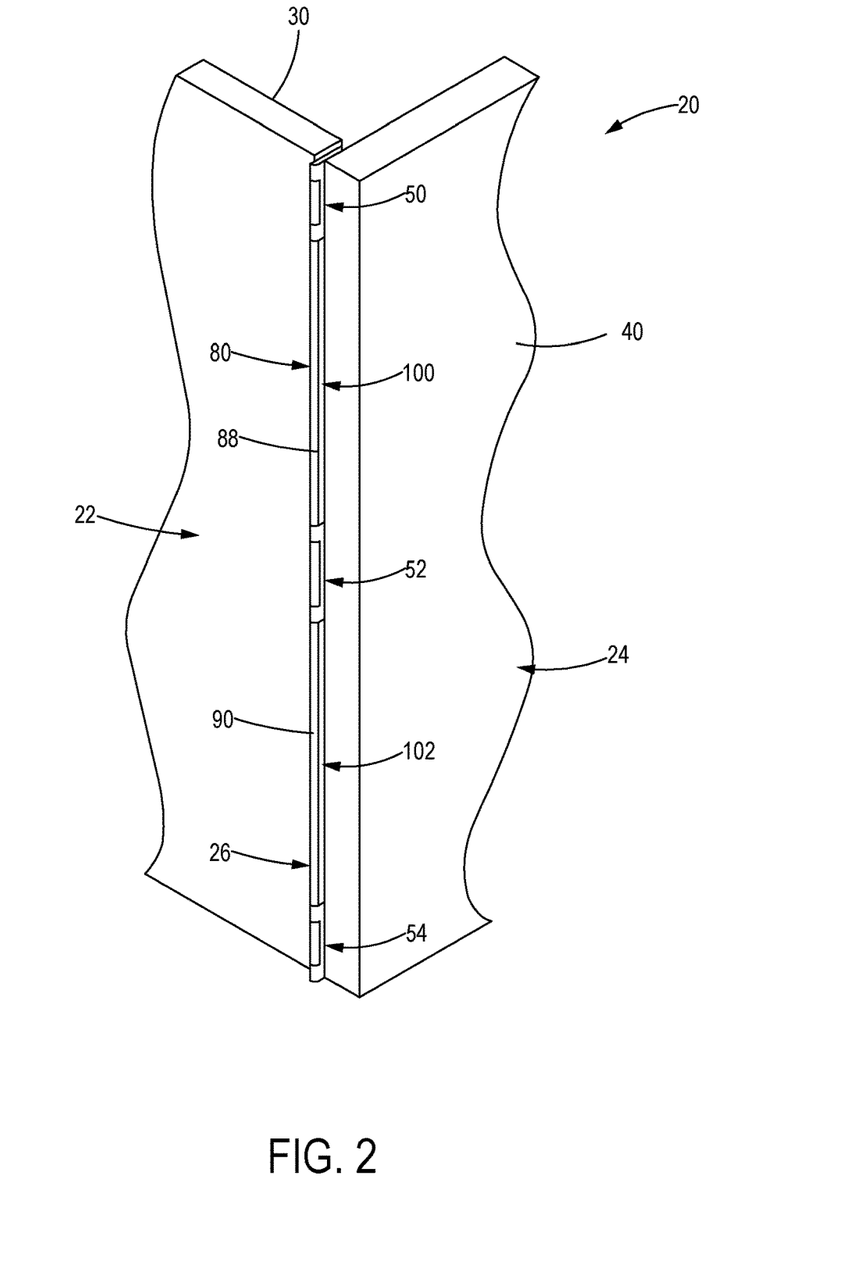
FIG. 2 is an enlarged perspective view of a portion of the door assembly of FIG. 1.
Figure 3:
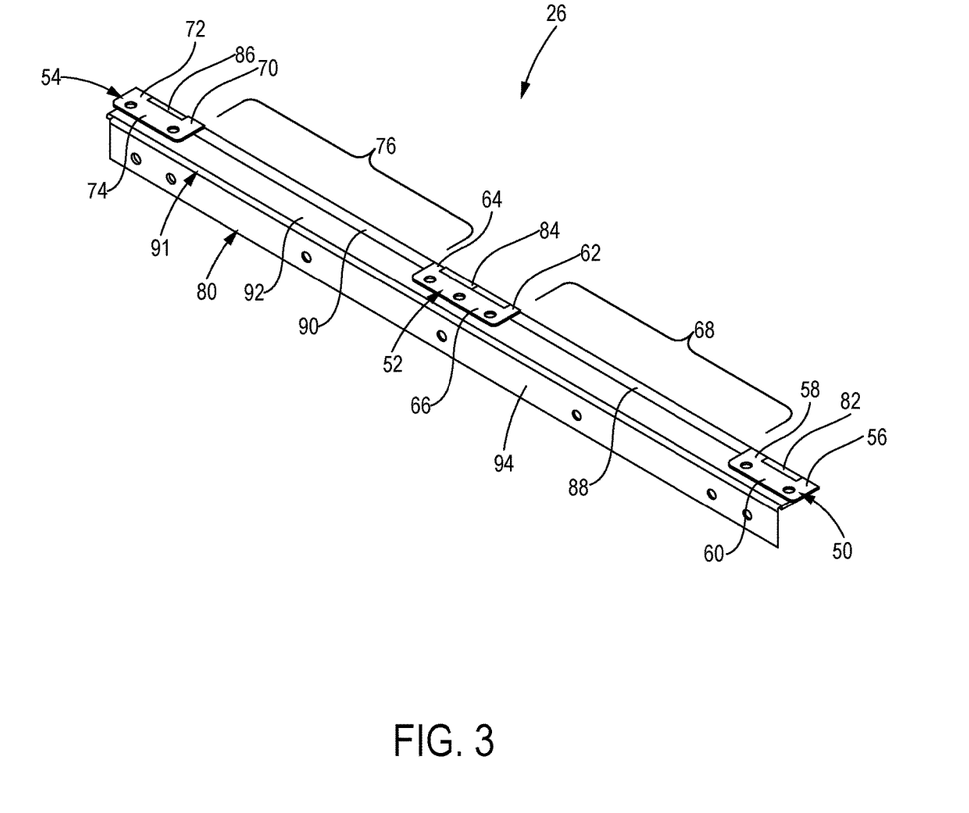
FIG. 3 is a perspective view of a hinge assembly used in the door assembly of FIG. 1.
Figure 4:
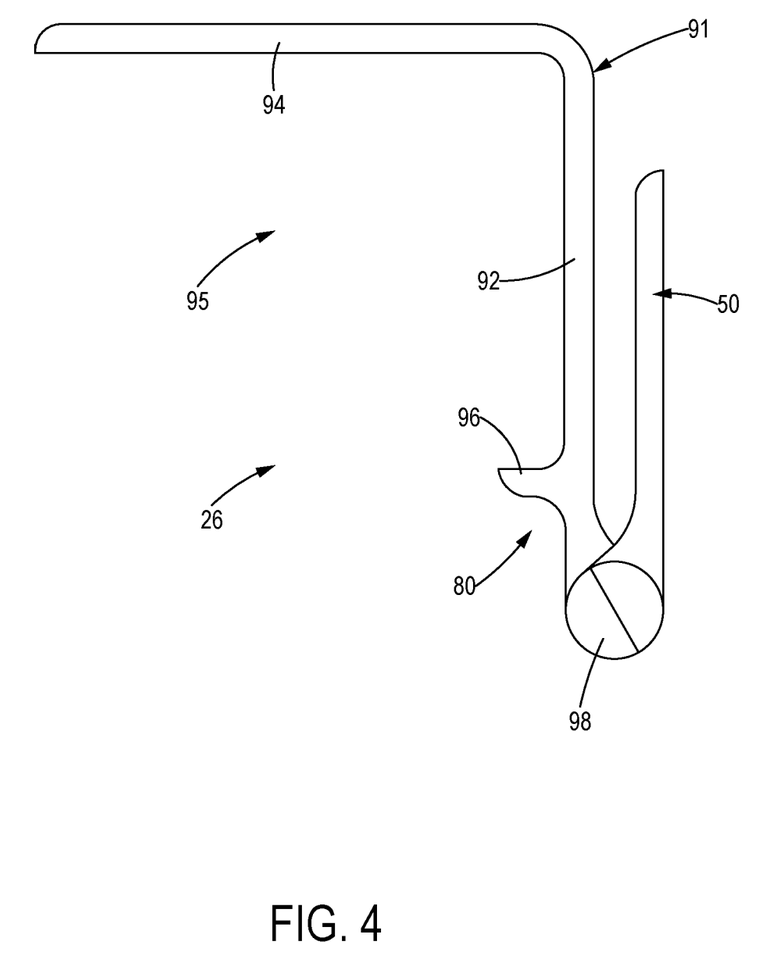
FIG. 4 is an enlarged plan view of the hinge assembly of FIG. 3.

The hinge assembly 26 pivotably connects the door 22 to the monument 40. As best shown in FIGS. 2-4, portions of the hinge assembly 26 configured for attachment to the monument 40 include a first monument piece 50, a second monument piece 52, and a third monument piece 54. While three monument pieces are illustrated, fewer than three or greater than three monument pieces may be used.

With specific reference to FIG. 3, the first monument piece 50 includes a first knuckle 56, a second knuckle 58 spaced apart from the first knuckle 56, and a monument leaf 60 extending between the first and second knuckles 56, 58 of the first monument piece 50. The monument leaf 60 is configured for coupling, such as by fasteners, to the monument 40.

Similarly, the second monument piece 52 is illustrated as including a first knuckle 62, a second knuckle 64 spaced apart from the first knuckle 62, and a monument leaf 66 extending between the first and second knuckles 62, 64 of the second monument piece 52. The monument leaf 66 is also configured for coupling, such as by fasteners, to the monument 40. As illustrated, the second monument piece 52 is spaced apart from the first monument piece 50 by a distance defined herein as a first monument piece space 68.

Still further, the third monument piece 54 is similar to the first and second monument pieces 50, 52, and includes a first knuckle 70, a second knuckle 72 spaced apart from the first knuckle 70, and a monument leaf 74 extending between the first and second knuckles 70, 72 of the third monument piece 54. The monument leaf 74 is also configured for coupling, such as by fasteners, to the monument 40. Furthermore, the third monument piece 54 is spaced apart from the second monument piece by a second monument piece space 76.

While each of the first, second, and third monument pieces 50, 52, 54 is illustrated as having two knuckles, it will be appreciated that a fewer or greater number of knuckles may be provided on each monument piece.

The hinge assembly 26 further includes a door piece 80 for attachment to the door 22. With continued reference to FIGS. 3 and 4, the exemplary door piece 80 includes a first door knuckle 82 extending between the first and second knuckles 56, 58 of the first monument piece 50, a second door knuckle 84 extending between the first and second knuckles 62, 64 of the second monument piece 52, and a third door knuckle 86 extending between the first and second knuckles 70, 72 of the third monument piece 54. The door piece 80 also has a first intermediate door knuckle 88 disposed between the first and second door knuckles 82, 84 and extending across the first monument piece space 68, and a second intermediate door knuckle 90 disposed between the second and third door knuckles 84, 86 and extending across the second monument piece space 76. While three door knuckles 82, 84, 86 and two intermediate door knuckles 88, 90 are shown, it will be appreciated that greater or fewer knuckles may be provided on the door piece 80.

The door piece 80 further includes a door leaf 91 coupled to each of the first, second, third, first intermediate, and second intermediate door knuckles 82, 84, 86, 88, 90 and configured for attachment to the fixed end of the door 22. In the illustrated embodiment, the door leaf 91 extends continuously from the first door knuckle 82 to the second door knuckle 84 to the third door knuckle 86. Additionally, the door leaf 91 may extend substantially an entire length of the door 22, as shown in FIGS. 1 and 2.

The door leaf 91 may be particularly configured for attachment to the door 22. In the embodiment illustrated in FIGS. 4 and 5, for example, the door leaf 91 may include a first door leaf leg 92, which is directly coupled to the first, second, and third door knuckles 82, 84, 86, as well as the first and second intermediate door knuckles 88, 90. A second door leaf leg 94 extends substantially perpendicular to the first door leaf leg 92. The door leaf 91 may further include a third door leaf leg 96 which also extends substantially perpendicular to the first door leaf leg 92 and is spaced apart from the second door leaf leg 94. The first door leaf leg 92, second door leaf leg 94, and third door leaf leg 96 define a receptacle 95 configured to receive the fixed end 32 of the door 22. In the exemplary embodiment, the third door leaf leg 96 is shorter than the second door leaf leg 94.

The hinge assembly 26 further includes a pin 98 for pivotably coupling the first, second, and third monument pieces 50, 52, 54 to the door piece 80. As is generally known in the hinge art, each of the knuckles described herein is a hollow, circular member defining a passage through which the pin 98 may pass. Accordingly, the pin 98 extends through the first and second knuckles 56, 58 of the first monument piece 50, the first and second knuckles 62, 64 of the second monument piece 52, the first and second knuckles 70, 72 of the third monument piece 54, the first door knuckle 82, the second door knuckle 84, the third door knuckle 86, the first intermediate door knuckle 88, and the second intermediate door knuckle 90. With the pin 98 inserted through the knuckles, the pin 98 supports the door piece 80 for rotation relative to the first, second, and third monument pieces 50, 52, 54, thereby to allow the door 22 to pivot relative to the monument 40.

Figure 5:
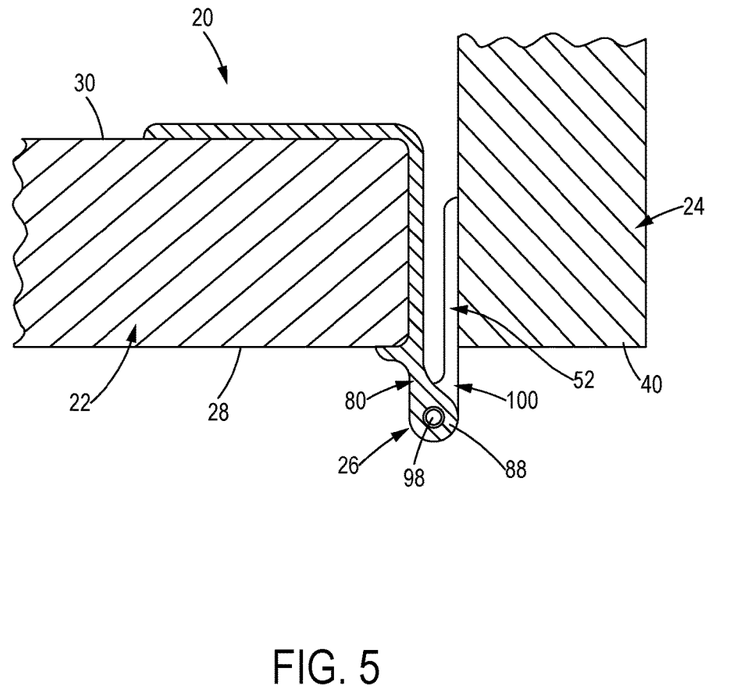
FIG. 5 is an enlarged plan view, in cross-section, of the door assembly taken along section line 5-5 of FIG. 1.

As best shown in FIGS. 1 and 5, the hinge assembly 26 creates vents to permit quicker equalization of ambient conditions on opposite sides of the door 22. More specifically, the hinge assembly creates spaces between the door piece 80 and the monument 40 that permit fluid flow through the hinge assembly 26. A first vent gap 100 is formed in a space between the first intermediate door knuckle 88 and the monument 40, while a second vent gap 102 is formed in a space between the second intermediate door knuckle 90 and the monument 40. The size and configuration of the components of the hinge assembly 26 may be selected to control the size of the first and second vent gaps 100, 102. For example, a vertical length of the first and second vent gaps 100, 102 is affected by the widths of the knuckles provided on the first, second, and third monument pieces 50, 52, 54.

The hinge assembly 26 of the present disclosure, therefore, creates one or more vent gaps that permit quicker equalization of ambient conditions on opposite sides of a door. The use of an intermediate door knuckle extending between two spaced apart monument pieces creates a stylish design that is aesthetically pleasing when the door is in a closed position while at the same time creating one or more functional vent gaps. The intermediate door knuckle(s) cooperates with the knuckles formed on the monument pieces and the other door knuckles to create the appearance of a continuous, hinge structure that can extend the length of the door while creating the necessary vent gaps The illustrated hinge assembly 26 further ensures that desired gaps may be formed around the perimeter of the door, thereby to improve equalization of ambient conditions across the door 22. More specifically, by forming the door piece 80 with the receptacle 95, a position of the fixed end 32 of the door 22 is adjustable relative to the receptacle 95. Accordingly, the door 22 may be positioned to create gaps between the door 22 and the frame 24 around a perimeter of the door 22. More specifically, the door 22 may be positioned to create a side gap 110 between the free end 34 of the door 22 and the side edge 42 of the frame 24, a top gap 112 between the top end 36 of the door 22 and the top edge 44 of the frame 24, and a bottom gap 114 between the bottom end 38 of the door 22 and the bottom edge 46 of the frame 24. By ensuring gaps around the other ends of the door 22, forces generated by the differences in ambient conditions are more uniformly distributed across the door, reducing structural strength requirements for the door, which in turn reduces cost and weight of the door assembly 20.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure. Various modifications, as are suited to the particular use, are contemplated.

What is claimed is:

1. A hinge assembly for pivotably attaching a door to a monument, the hinge assembly comprising:
    a first monument piece including a first knuckle and a monument leaf attached to the first knuckle of the first monument piece and configured for coupling to the monument;
    a second monument piece including a first knuckle and a monument leaf attached to the first knuckle of the second monument piece and configured for coupling to the monument, wherein the second monument piece is spaced apart from the first monument piece by a first distance;
    a door piece including an intermediate door knuckle extending across the first distance, and a door leaf coupled to the intermediate door knuckle and configured for attachment to the door; and
    a pin extending through the first knuckle of the first monument piece, the first knuckle of the second monument piece, and the intermediate door knuckle;
    wherein, when the hinge assembly is mounted to the door and monument, a space is formed between the intermediate door knuckle and the monument to define a vent gap through the hinge assembly.

2. The hinge assembly of claim 1, in which:
    the first monument piece further includes a second knuckle spaced apart from the first knuckle of the first monument piece, wherein the monument leaf of the first monument piece extends between the first and second knuckles of the first monument piece; and
    the second monument piece further includes a second knuckle spaced apart from the first knuckle of the second monument piece, wherein the monument leaf of the second monument piece extends between the first and second knuckles of the second monument piece.

3. The hinge assembly of claim 2, in which the door piece further includes:
    a first door knuckle extending between the first and second knuckles of the first monument piece; and
    a second door knuckle extending between the first and second knuckles of the second monument piece.

4. The hinge assembly of claim 3, in which the door leaf extends continuously from the first door knuckle to the second door knuckle.

5. The hinge assembly of claim 4, in which the door has a door length, and in which the door leaf extends substantially the door length.

6. The hinge assembly of claim 3, in which the door leaf comprises a first door leaf leg coupled to the first door knuckle, the second door knuckle, and the intermediate door knuckle, and a second door leaf leg extending substantially perpendicular to the first door leaf leg.

7. The hinge assembly of claim 6, in which the door leaf further comprises a third door leaf leg extending substantially perpendicular to the first door leaf leg and spaced apart from the second door leaf leg, wherein the first door leaf leg, second door leaf leg, and third door leaf leg define a receptacle configured to receive a fixed end of the door.

8. The hinge assembly of claim 6, further comprising:
a third monument piece including a first knuckle, a second knuckle spaced apart from the first knuckle, and a monument leaf extending between the first and second knuckles of the third monument piece and configured for coupling to the monument, wherein the third monument piece is spaced apart from the second monument piece by a second distance;
wherein the door piece further includes a third door knuckle extending between the first and second knuckles of the third monument piece, and a second intermediate door knuckle disposed between the second door knuckle and the third door knuckle and extending across the second distance;
wherein the door leaf is further coupled to the third door knuckle and the second intermediate door knuckle;
wherein the pin further extends through the second intermediate door knuckle; and
wherein, when the hinge assembly is placed on the door and monument, a second space is defined between the second intermediate door knuckle and the monument to define a second vent gap.

9. The hinge assembly of claim 8, in which the door leaf extends continuously from the first door knuckle to the third door knuckle.

10. A door assembly, comprising
a door defining a fixed end, a free end, a top end, and a bottom end;
a frame extending around the door and including a monument, a side edge spaced apart from the monument, a top edge extending between the monument and the side edge, and a bottom edge spaced apart from the top edge and extending between the monument and the side edge; and
a hinge assembly for pivotably mounting the door to the monument, the hinge assembly comprising:
a first monument piece including a first knuckle and a monument leaf attached to the first knuckle of the first monument piece and configured for coupling to the monument;
a second monument piece including a first knuckle and a monument leaf attached to the first knuckle of the second monument piece and configured for coupling to the monument, wherein the second monument piece is spaced apart from the first monument piece by a first distance;
a door piece including:
an intermediate door knuckle extending across the first distance;
a door leaf coupled to the intermediate door knuckle and configured for attachment to the door, the door leaf comprising defining a receptacle configured to receive the fixed end of the door; and
a pin extending through the first knuckle of the first monument piece, the first knuckle of the second monument piece, and the intermediate door knuckle;
wherein, when the hinge assembly is mounted to the door and monument, a space is formed between the intermediate door knuckle and the monument to define a vent gap through the hinge assembly; and
wherein a position of the fixed end of the door is adjustable relative to the receptacle to create a side gap between the free end of the door and the side edge of the frame, a top gap between the top end of the door and the top edge of the frame, and a bottom gap between the bottom end of the door and the bottom edge of the frame.

11. The door assembly of claim 10, in which the door leaf further comprises:
a first door leaf leg coupled to the intermediate door knuckle;
a second door leaf leg extending substantially perpendicular from the first door leaf leg; and
a third door leaf leg extending substantially perpendicular to the first door leaf leg and spaced apart from the second door leaf leg;
wherein the first door leaf leg, second door leaf leg, and third door leaf leg define the receptacle.

12. The door assembly of claim 11, in which the door has a door length, and in which the first, second, and third door leaf legs extend substantially the door length.

13. The door assembly of claim 11, in which the third door leaf leg is shorter than the second door leaf leg.

14. The door assembly of claim 10, in which the hinge assembly further comprises:
a third monument piece including a first knuckle, and a monument leaf attached to the first knuckle of the third monument piece and configured for coupling to the monument, wherein the third monument piece is spaced apart from the second monument piece by a second distance;
wherein the door piece further includes a second intermediate door knuckle extending across the second distance;
wherein the door leaf is further coupled to the second intermediate door knuckle;
wherein the pin further extends through the second intermediate door knuckle; and
wherein, when the hinge assembly is mounted to the door and monument, a second space is defined between the second intermediate door knuckle and the monument to define a second vent gap through the hinge assembly.

15. A door assembly, comprising:
a door defining a fixed end;
a monument configured to support the door; and
a hinge assembly comprising:
a first monument piece including a first knuckle, a second knuckle spaced apart from the first knuckle, and a monument leaf extending between the first and second knuckles of the first monument piece and configured for coupling to the monument;
a second monument piece including a first knuckle, a second knuckle spaced apart from the first knuckle, and a monument leaf extending between the first and second knuckles of the second monument piece and configured for coupling to the monument, wherein the second monument piece is spaced apart from the first monument piece by a first distance;
a door piece including:
a first door knuckle extending between the first and second knuckles of the first monument piece;

a second door knuckle extending between the first and second knuckles of the second monument piece;

an intermediate door knuckle disposed between the first and second door knuckles and extending across the first distance; and a door leaf coupled to the first door knuckle, second door knuckle, and intermediate door knuckle, and configured for attachment to the fixed end of the door; and a pin extending through the first and second knuckles of the first monument piece, the first and second knuckles of the second monument piece, the first door knuckle, the second door knuckle, and the intermediate door knuckle;

wherein, when the hinge assembly is mounted to the door and monument, a space is formed between the intermediate door knuckle and the monument to define a vent gap through the hinge assembly.

16. The door assembly of claim 15, in which the door leaf comprises a first door leaf leg coupled to the first door knuckle, second door knuckle, and intermediate door knuckle, and a second door leaf leg extending substantially perpendicular to the first door leaf leg.

17. The door assembly of claim 16, in which the door leaf further comprises a third door leaf leg extending substantially perpendicular to the first door leaf leg and spaced from the second door leaf leg, wherein the first door leaf leg, second door leaf leg, and third door leaf leg define a receptacle configured to receive the fixed end of the door.

18. The door assembly of claim 17, in which the third door leaf leg is shorter than the second door leaf leg.

19. The door assembly of claim 15, further comprising:

a third monument piece including a first knuckle, a second knuckle spaced apart from the first knuckle, and a monument leaf extending between the first and second knuckles of the third monument piece and configured for coupling to the monument, wherein the third monument piece is spaced apart from the second monument piece by a second distance;

wherein the door piece further includes a third door knuckle extending between the first and second knuckles of the third monument piece, and a second intermediate door knuckle disposed between the second and third door knuckles and extending across the second distance;

wherein the door leaf is further coupled to the third door knuckle and the second intermediate door knuckle;

wherein the pin further extends through the second intermediate door knuckle; and wherein, when the hinge assembly is mounted to the door and monument, a second space is defined between the second intermediate door knuckle and the monument to define a second vent gap through the hinge assembly.

20. The door assembly of claim 19, in which the door leaf extends continuously from the first door knuckle to the third door knuckle.

\* \* \* \* \*